(12) United States Patent
Padilla

(10) Patent No.: US 11,815,499 B1
(45) Date of Patent: Nov. 14, 2023

(54) RESONANT COLUMN DEVICE FOR SOIL TESTING

(71) Applicant: Geotechnical Consulting and Testing Systems, LLC, Tempe, AZ (US)

(72) Inventor: Jose Manuel Padilla, Tempe, AZ (US)

(73) Assignee: GEOTECHNICAL CONSULTING AND TESTING SYSTEMS, LLC, Tempe, AZ (US)

( * ) Notice: Subject to any disclaimer, the term of this patent is extended or adjusted under 35 U.S.C. 154(b) by 475 days.

(21) Appl. No.: 17/232,097

(22) Filed: Apr. 15, 2021

(51) Int. Cl.
*G01N 3/22* (2006.01)

(52) U.S. Cl.
CPC ....... *G01N 3/22* (2013.01); *G01N 2203/0017* (2013.01); *G01N 2203/0021* (2013.01); *G01N 2203/0026* (2013.01); *G01N 2203/0033* (2013.01)

(58) Field of Classification Search
CPC ............. G01N 3/22; G01N 2203/0017; G01N 2203/0021; G01N 2203/0026; G01N 2203/0033; G01N 30/06; G01N 35/00; G01N 1/30; G01N 35/1009; G01N 3/08; G01N 33/4833; G01N 35/10; G01N 1/00; G01N 1/2813; G01N 21/51; G01N 35/00732; G01N 3/24
See application file for complete search history.

(56) References Cited

U.S. PATENT DOCUMENTS

| | | | | |
|---|---|---|---|---|
| 2014/0301916 | A1* | 10/2014 | Ohga | B01L 9/06 422/562 |
| 2016/0202160 | A1* | 7/2016 | Saari | G01N 3/02 73/788 |
| 2019/0252828 | A1* | 8/2019 | Miyamoto | H01R 13/6583 |

FOREIGN PATENT DOCUMENTS

WO    WO-2011090928 A1 * 7/2011 ........... H01R 12/596

\* cited by examiner

*Primary Examiner* — Brandi N Hopkins
(74) *Attorney, Agent, or Firm* — BOOTH UDALL FULLER, PLC; Kenneth C. Booth

(57) ABSTRACT

A resonant column device configured to perform a resonant column test on a specimen and measure an angular deformation of the specimen. The resonant column device has a housing mounted on a base, a specimen container within the housing, a cell wall surrounding the specimen container, a load frame within the housing with a support bar above the specimen container, a torque motor suspended from the support bar with a plurality of springs, and a laser deformation sensor within the housing outside of the specimen container. The specimen container is configured to hold the specimen during testing. The cell wall is configured to fluidly isolate the specimen container from an interior volume of the housing. The torque motor is configured to apply a torsional harmonic load to the specimen, and the laser deformation sensor is configured to measure an angular deformation of the specimen.

20 Claims, 11 Drawing Sheets

RESONANT COLUMN DEVICE FOR SOIL TESTING

TECHNICAL FIELD

Aspects of this document relate generally to a resonant column device, and more specifically to a resonant column device with improved functionality and usability.

BACKGROUND

Dynamic soil properties of a soil specimen are important parameters for the analysis and design of structures required to resist dynamic loads such as earthquake shaking, machinery vibration, traffic loading, etc. The resonant column test is a commonly used laboratory test for measuring dynamic soil properties. The resonant column test is performed by vibrating a solid or hollow soil specimen to find the first-mode resonant frequency of the soil specimen, which is then used to determine additional dynamic soil properties. Currently, resonant column systems require a high level of expertise and significant time and effort by the user. For example, current systems require that some of the electronics be removed to access the specimen container, and thus these electronics must be removed and then reinstalled between each test. In addition, in order to test different ranges of frequencies, different sensors must be installed within the test chamber, further requiring modification of the testing equipment during testing. This makes performing a resonant column test an expensive option and limits the number of situations where the benefits of performing a resonant column test outweigh the costs.

Current resonant column systems also have limited torque capacity, angular deformation, and vertical deformation through consolidation, and the current method of applying torsional stress to induce the vibrations also causes a bending stress, which interferes with the resonant column test. Electronics within current resonant column systems are exposed to changing pressure and moisture, which leads to corrosion. All of these characteristics of current resonant column systems makes them less valuable and harder to operate, and therefore, less useful.

SUMMARY

Aspects of this document relate to a resonant column device which may include a housing mounted on a base and having an interior volume, a specimen container within the housing and supported by the base, the specimen container comprising a top cell plate, a bottom cell plate, a cell column joining the top cell plate and the bottom cell plate and having a half-pipe-shaped cross section, and a central axis passing through a center of the specimen container, the specimen container configured to hold a specimen during testing, an acrylic cell wall surrounding the specimen container and configured to fluidly isolate the specimen container from the interior volume of the housing to enable a variable pressure within the specimen container, a load frame within the housing and supported by the base, the load frame having a support bar extending horizontally above the specimen container, a torque motor suspended from the support bar of the load frame with a plurality of springs and aligned with the central axis of the specimen container above the top cell plate, the torque motor configured to apply a torsional harmonic load to the specimen and move with the specimen through vertical deformations of the specimen without applying an axial load to the specimen, an axial actuator coupled to the support bar of the load frame, aligned with the central axis of the specimen container, and configured to apply an axial load to the specimen to produce anisotropic consolidation of the specimen, a load cell operatively coupled to the axial actuator and configured to measure the axial load applied by the axial actuator, a laser deformation sensor supported by the base within the housing outside of the specimen container and configured to measure an angular deformation of the specimen, the laser deformation sensor having a laser configured to emit a laser beam and a shear strain target positioned on a target support frame at an angle from the laser beam of between 10 degrees and 45 degrees from the laser beam, and an automatic cell lift coupled to the base and configured to lift the acrylic cell wall to provide access to the specimen, wherein the resonant column device is configured to automatically perform a resonant column test on the specimen upon activation and determine a first-mode resonant frequency of the specimen.

Particular embodiments may include one or more of the following features. A water reservoir within the housing configured to supply water to the specimen container and submerge the specimen in water during testing. A plurality of spherical load buttons coupled to the axial actuator and configured to transmit the axial load from the axial actuator to the specimen with negligible torque. A plurality of preloaded slide bearings coupled to the torque motor and configured to limit movement of the torque motor in a horizontal direction while allowing movement in a vertical direction. A portion of the cell wall may be exposed by an opening through the housing and wherein the specimen is accessible through the opening when the cell wall is lifted by the automatic cell lift. The specimen may be one of a soil specimen, a rock specimen, and an asphalt specimen. A linear variable differential transformer fixedly coupled to the torque motor and configured to measure a vertical compression of the specimen caused by the axial actuator.

According to an aspect of the disclosure, a resonant column device may include a housing mounted on a base and having an interior volume, a specimen container within the housing and supported by the base, the specimen container comprising a cell column and configured to hold a specimen during testing, a cell wall surrounding the specimen container and configured to fluidly isolate the specimen container from the interior volume of the housing, a load frame within the housing and supported by the base, the load frame having a support bar above the specimen container, a torque motor suspended from the support bar of the load frame with a plurality of springs and configured to apply a torsional harmonic load to the specimen, and a laser deformation sensor supported by the base within the housing outside of the specimen container and configured to measure an angular deformation of the specimen, wherein the resonant column device is configured to perform a resonant column test on the specimen and determine a first-mode resonant frequency of the specimen.

Particular embodiments may comprise one or more of the following features. A water reservoir within the housing configured to supply water to the specimen container and submerge the specimen in water during testing. A plurality of preloaded slide bearings coupled to the torque motor and configured to limit movement of the torque motor in a horizontal direction while allowing movement in a vertical direction. A portion of the cell wall may be exposed by an opening through the housing and wherein the specimen is accessible through the opening when the cell wall is lifted by the automatic cell lift. The specimen may be one of a soil specimen, a rock specimen, and an asphalt specimen. A linear variable differential transformer fixedly coupled to the torque motor and configured to measure a vertical compression of the specimen caused by the axial actuator. The cell column may include a cross section with a half-pipe shape. The torque motor may further be configured to move with the specimen through vertical deformations of the specimen without applying an axial load to the specimen. An axial actuator coupled to the support bar of the load frame and configured to apply an axial load to the specimen to produce anisotropic consolidation of the specimen. A plurality of spherical load buttons coupled to the axial actuator and configured to transmit the axial load from the axial actuator to the specimen and limit the torque transmission to the axial actuator. A load cell operatively coupled to the axial actuator and configured to measure the axial load applied by the axial actuator. An automatic cell lift coupled to the base and configured to lift the cell wall to provide access to the specimen. The specimen container may further comprise a central axis passing through a center of the specimen container, and the torque motor is aligned with the central axis of the specimen container.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
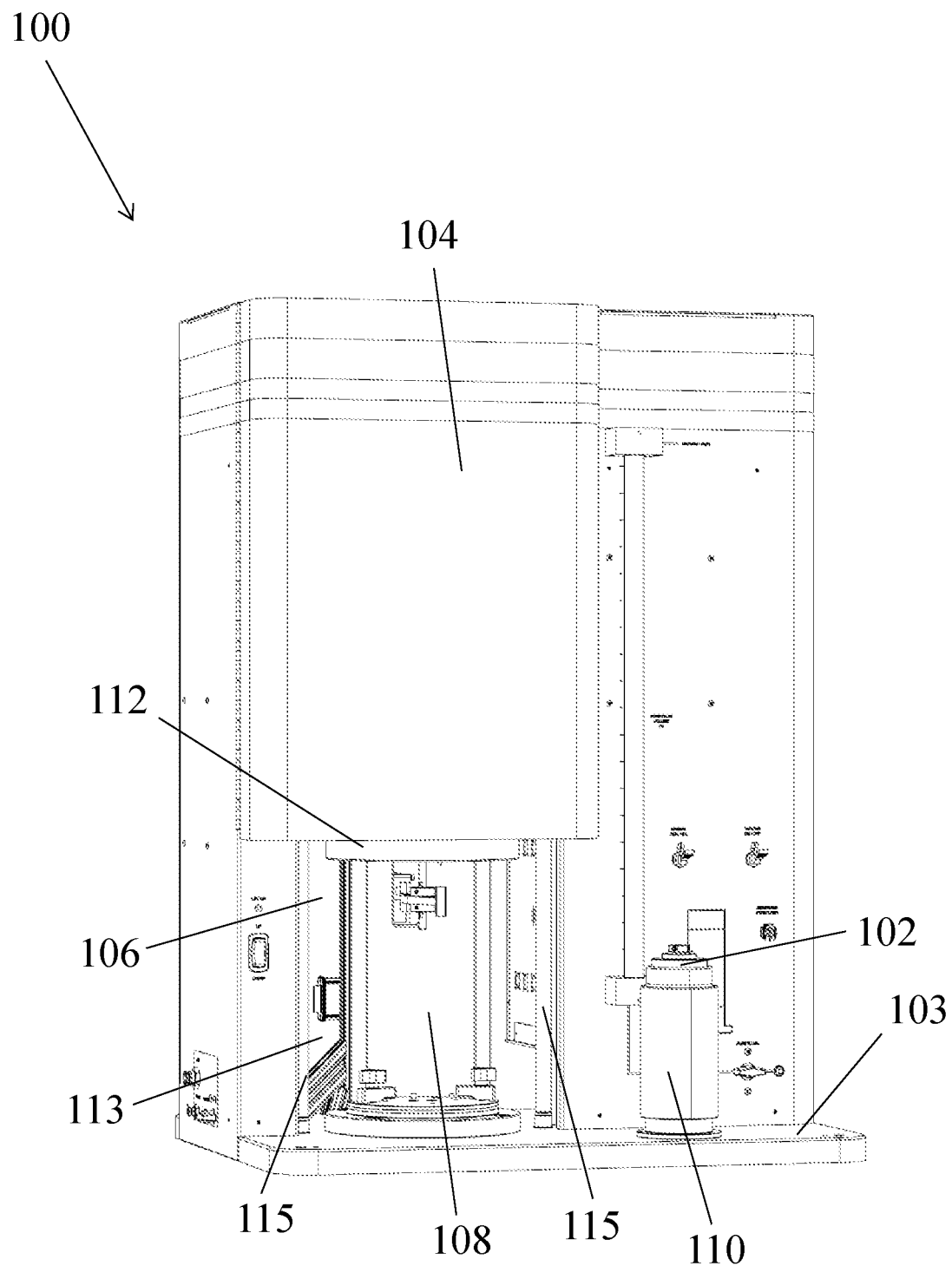
FIG. 1 is a perspective view of a resonant column device with a specimen mold.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure relates to a resonant column device 100 configured to perform a resonant column test on a specimen 102 and determine a first-mode resonant frequency of the specimen 102. The specimen 102 may be any material commonly found in the ground or another surface used to support structures and infrastructure such as roads. For example, the specimen 102 may be a soil specimen, a rock specimen, or an asphalt specimen. As shown in FIGS. 1-4, the resonant column device 100 has a base 103 supporting a housing 104 with an interior volume 106, and a specimen container 108 within the interior volume 106 of the housing 104 configured to hold the specimen 102 during testing. The specimen container 108 is supported by the base 103. When placed inside of the specimen container 108, the specimen 102 is fixed near the base 103 and free to rotate distal to the base 103. The resonant column device 100 is designed to facilitate the steps taken to perform a resonant column test.

Figure 2:
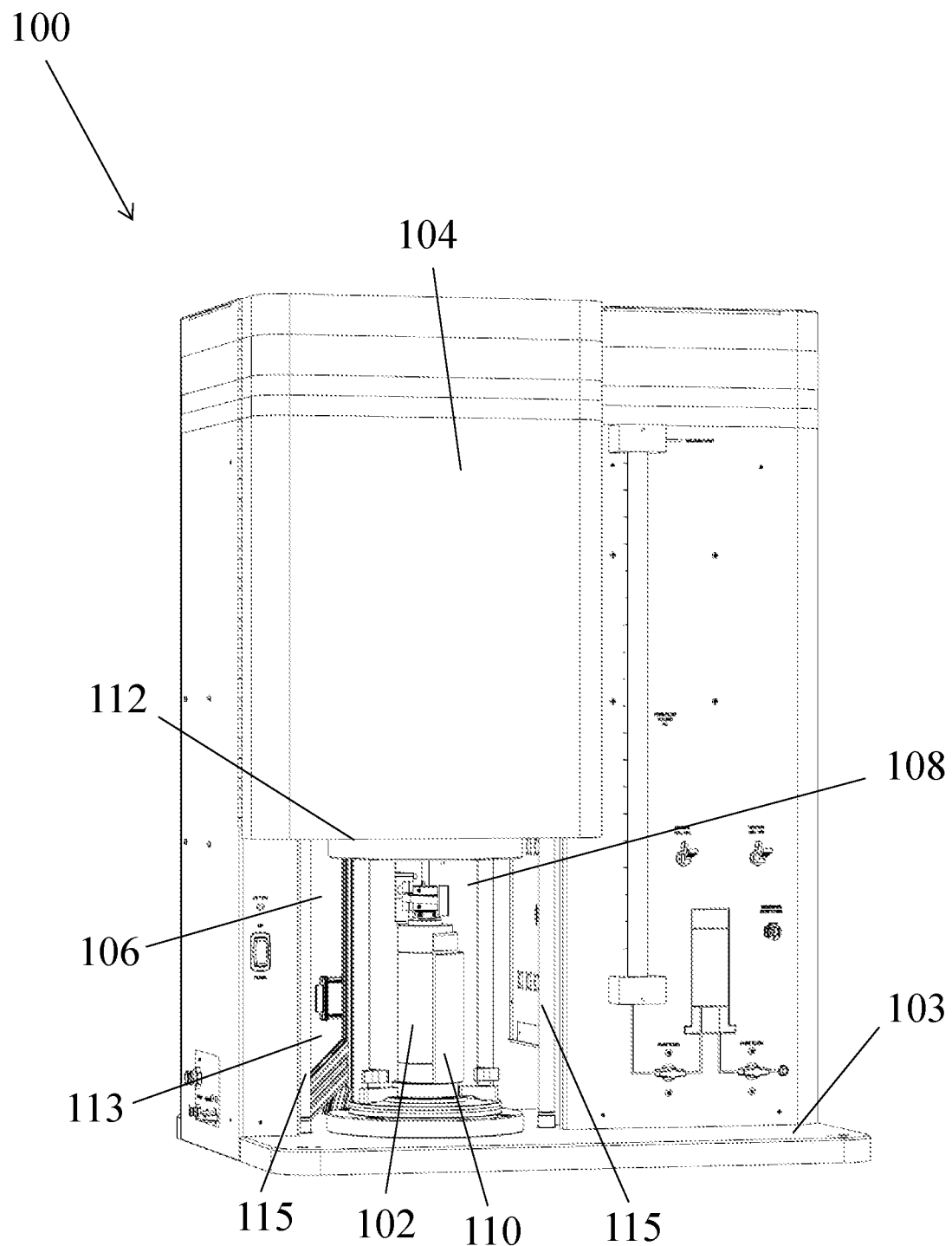
FIG. 2 is a perspective view of the resonant column device shown in FIG. 1 with the specimen placed inside the specimen container and the specimen mold partially removed.
Figure 3:
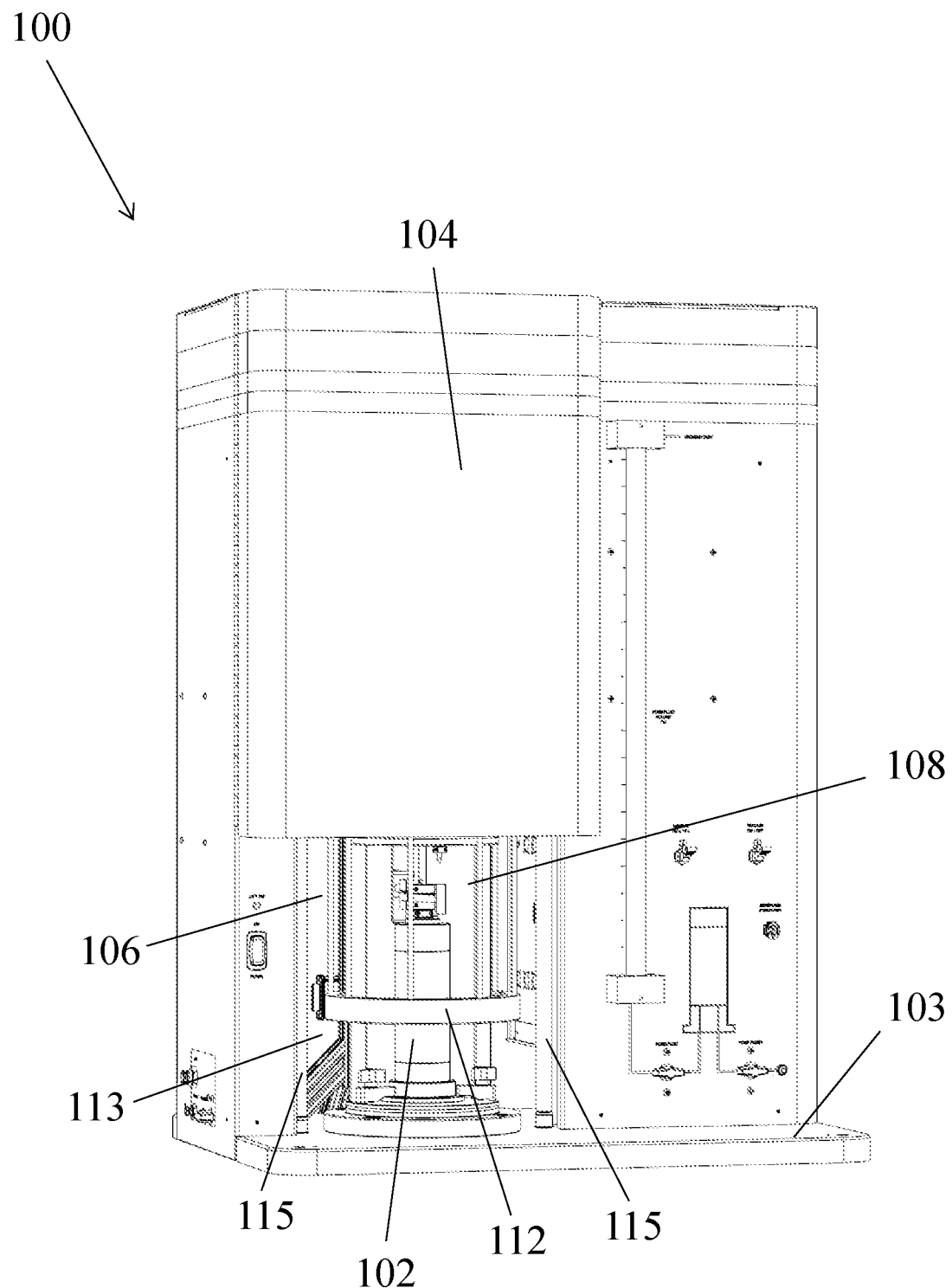
FIG. 3 is a perspective view of the resonant column device shown in FIG. 1 with the specimen placed inside the specimen container and the cell wall partially closed.
Figure 4:
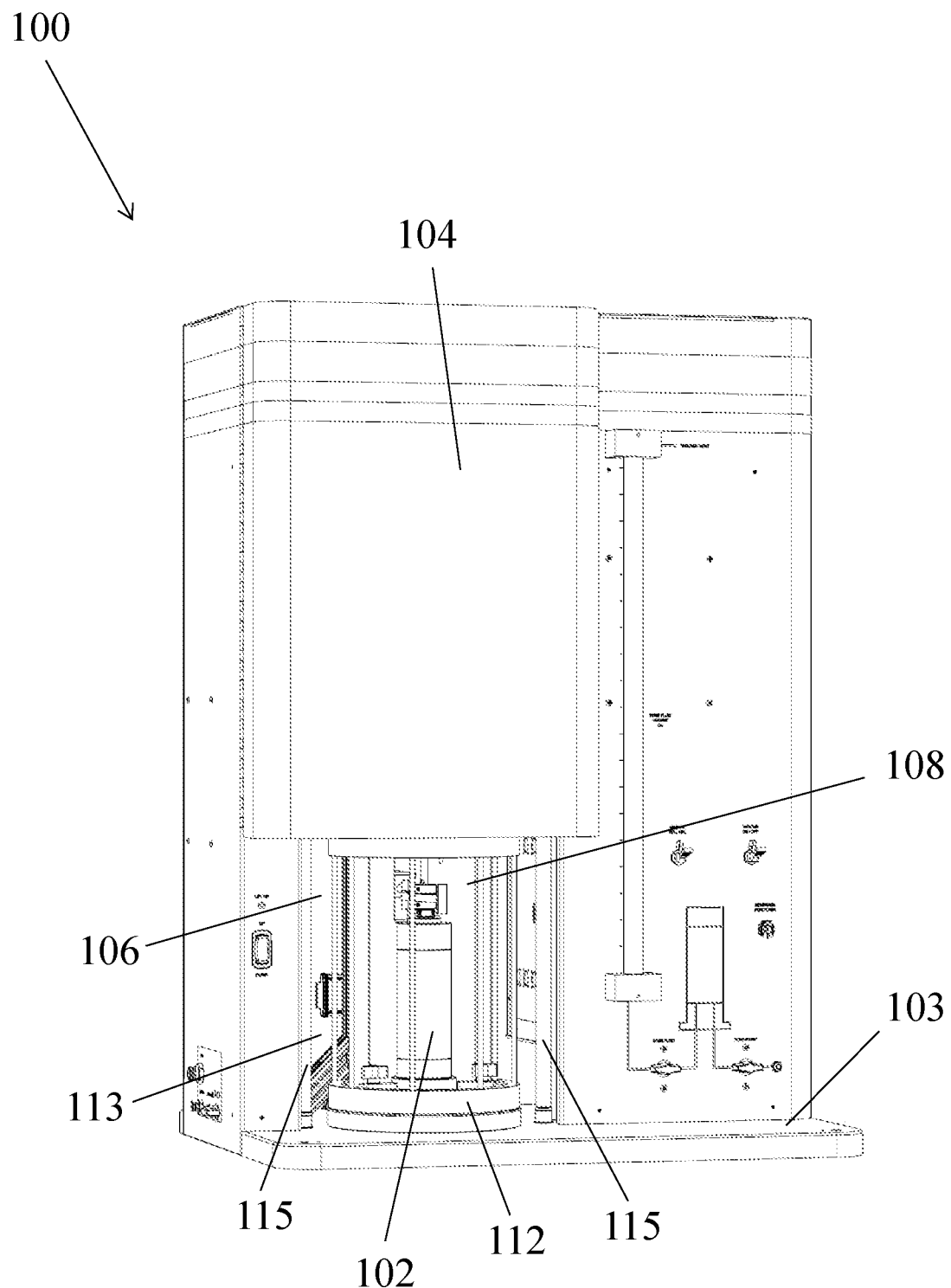
FIG. 4 is a perspective view of the resonant column device shown in FIG. 1 with the specimen placed in the specimen container.

As shown in FIG. 1, the specimen 102 may be compacted in a specimen mold 110. FIG. 2 illustrates that the specimen 102 may be removed from the mold 110 and placed inside of the specimen container 108. A cell wall 112, which may be formed of acrylic or another transparent material, may be lowered to surround the specimen container 108 to fluidly isolate the specimen container 108 from the interior volume 106 of the housing 104. An opening 113 through the housing 104 may expose a portion of the cell wall 112 and provide access to the interior volume 106 of the housing 104. A cell lift 115 may be used to lift the cell wall 112 to provide access to the specimen 102 and lower the cell wall 112 to fluidly isolate the specimen container 108 from the interior volume 106 of the housing 104. The specimen 102 is accessible through the opening 113 when the cell wall 112 is lifted by the cell lift 115. Fluidly isolating the specimen container 108 enables the pressure within the specimen container 108 to be variable and adjustable. A resonant column test may be run, as shown in FIGS. 3-4, without having to remove or replace any components of the resonant column device 100.

Figure 5:
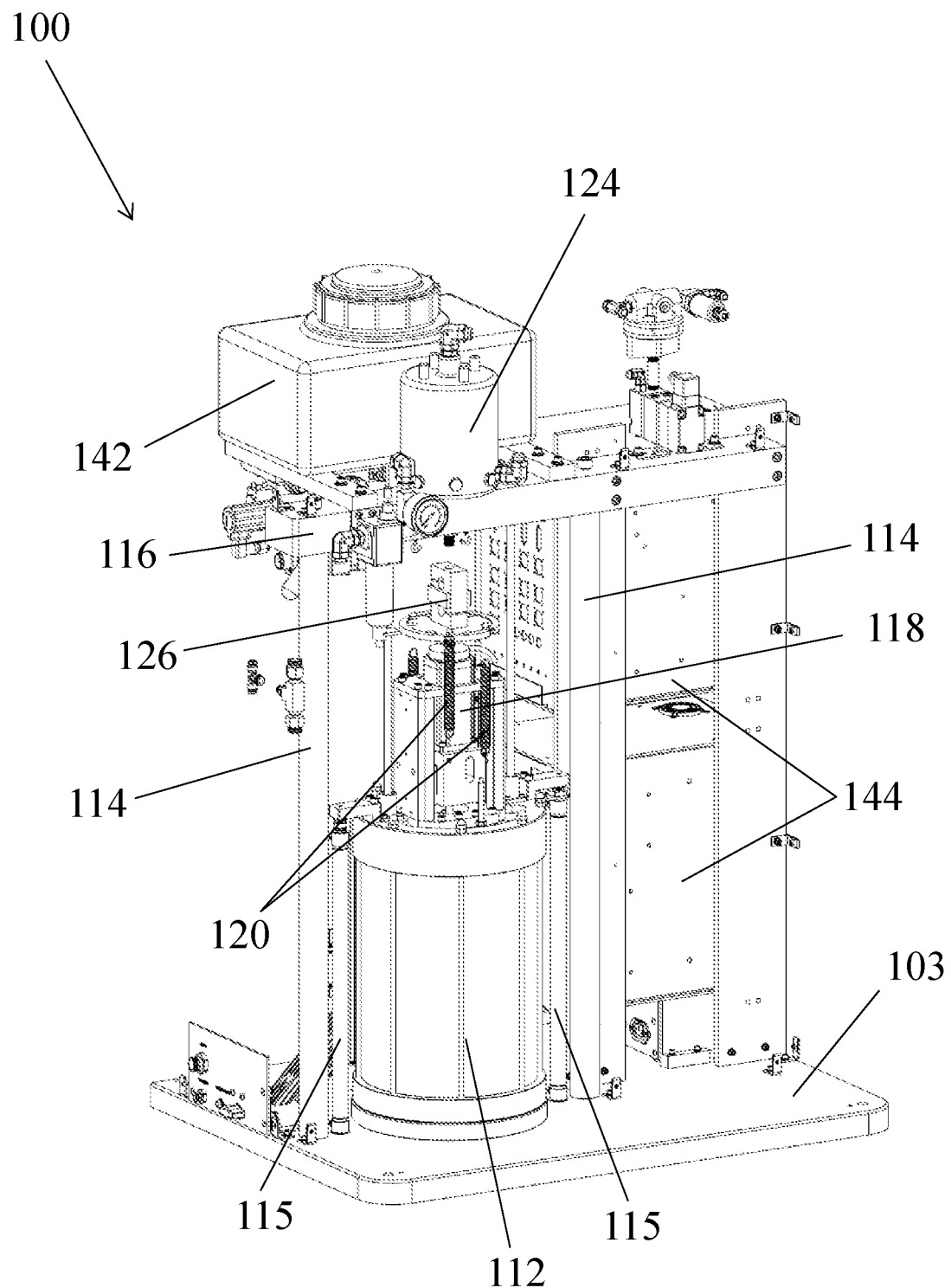
FIG. 5 is a perspective view of the front of the resonant column device shown in FIG. 1 with the housing removed to show the interior components.
Figure 6:
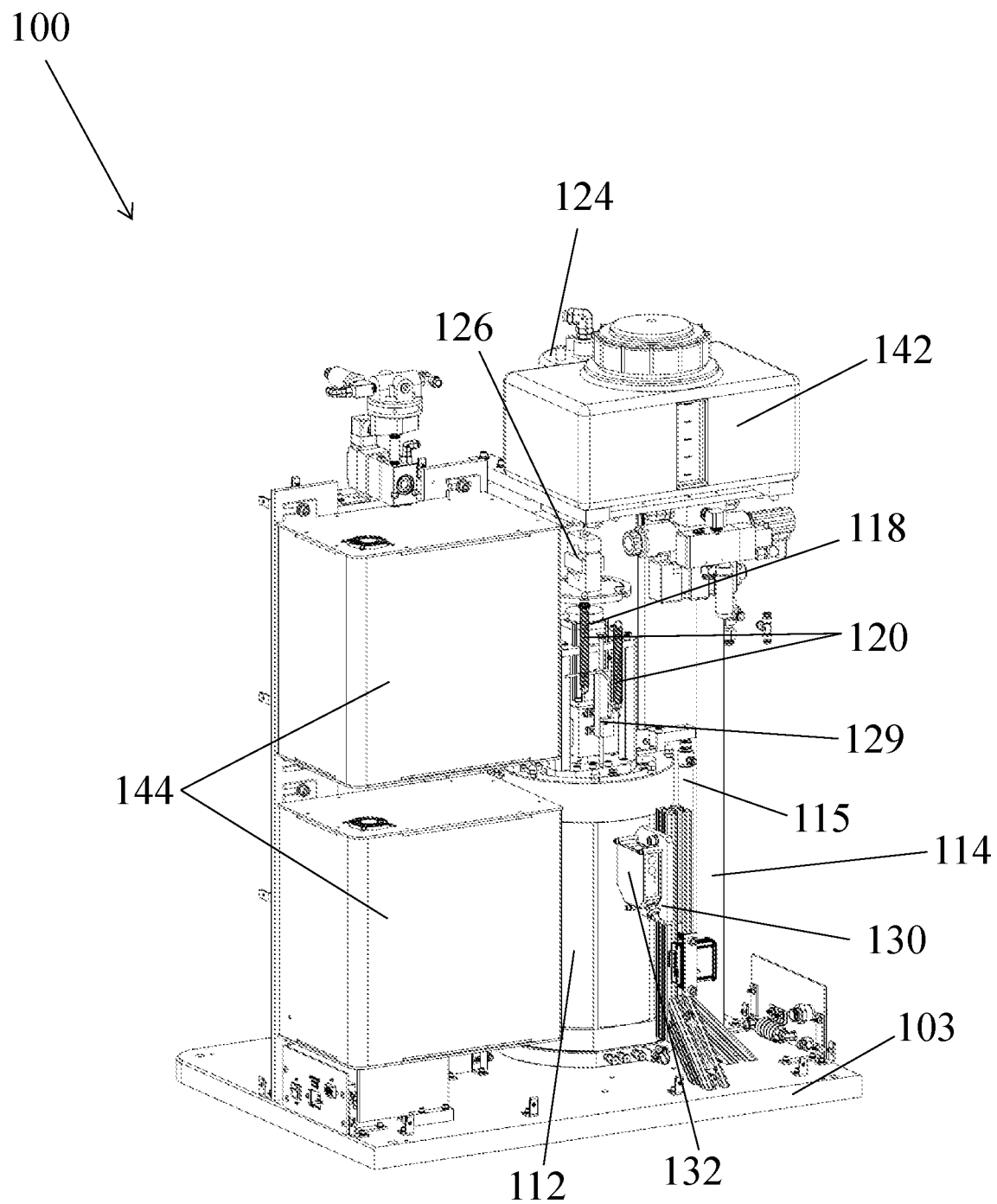
FIG. 6 is a perspective view of the back of the resonant column device shown in FIG. 1 with the housing removed to show the interior components.
Figure 7:
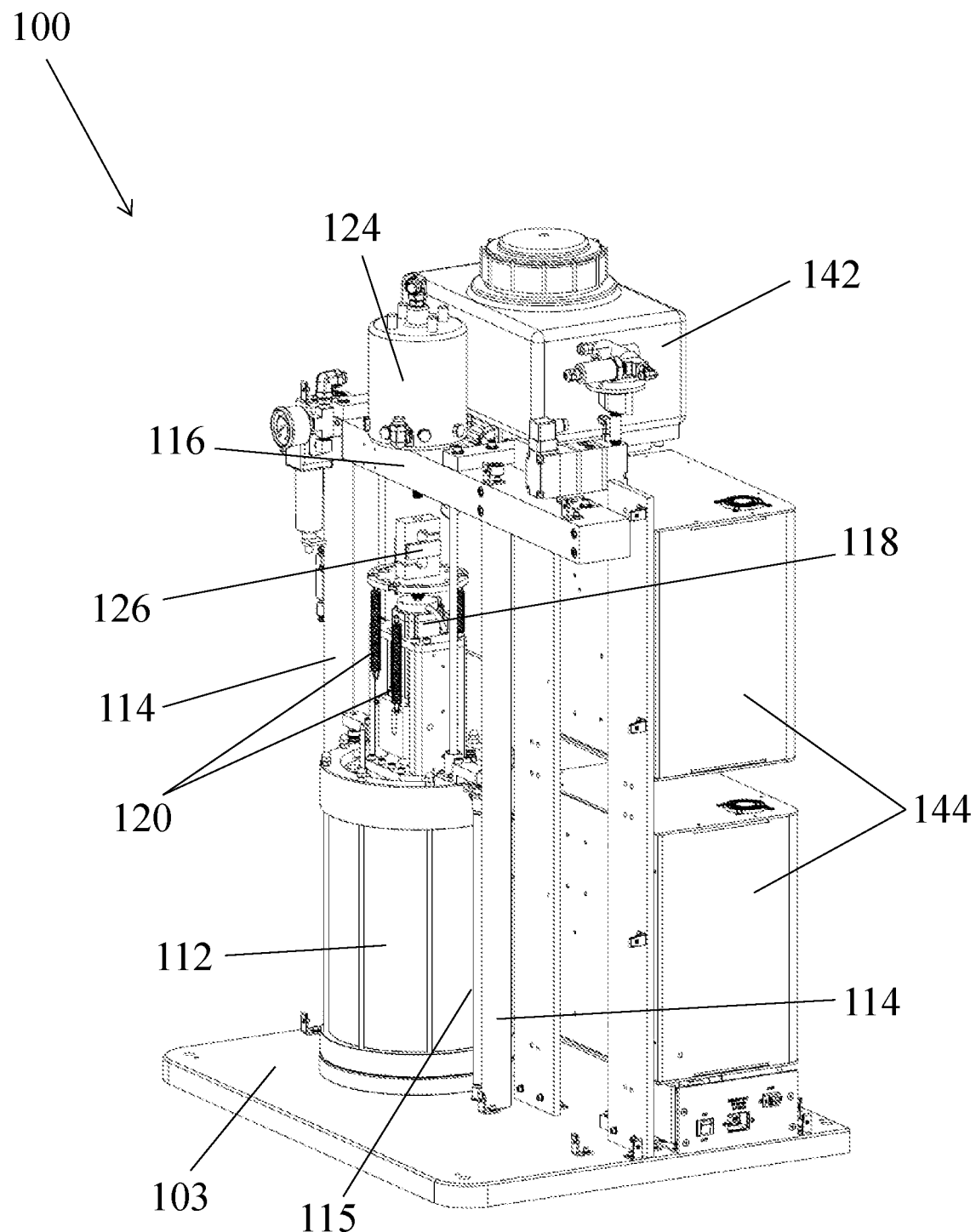
FIG. 7 is a perspective view of the side of the resonant column device shown in FIG. 1 with the housing removed to show the interior components.
Figure 8:
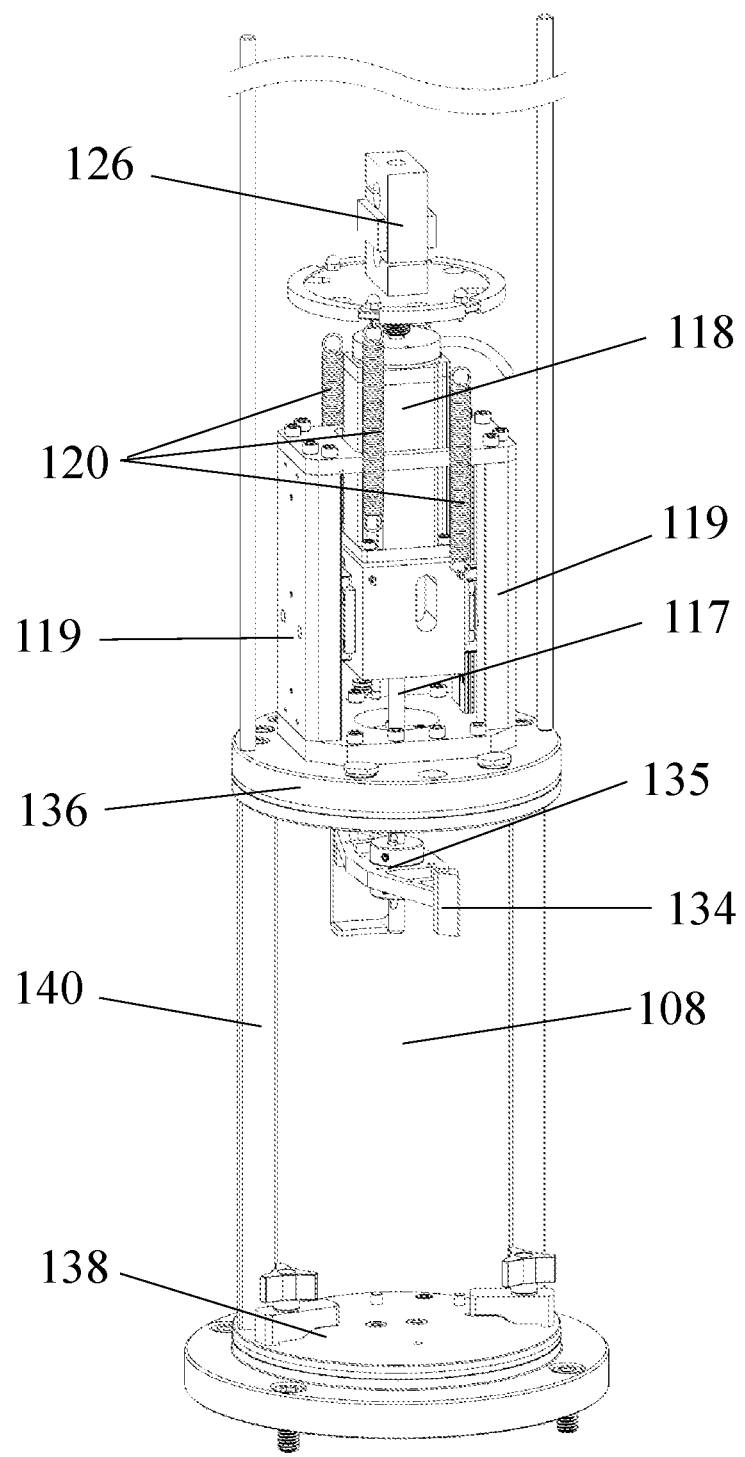
FIG. 8 is a perspective view of the resonant column of the resonant column device shown in FIG. 1.
Figure 9:
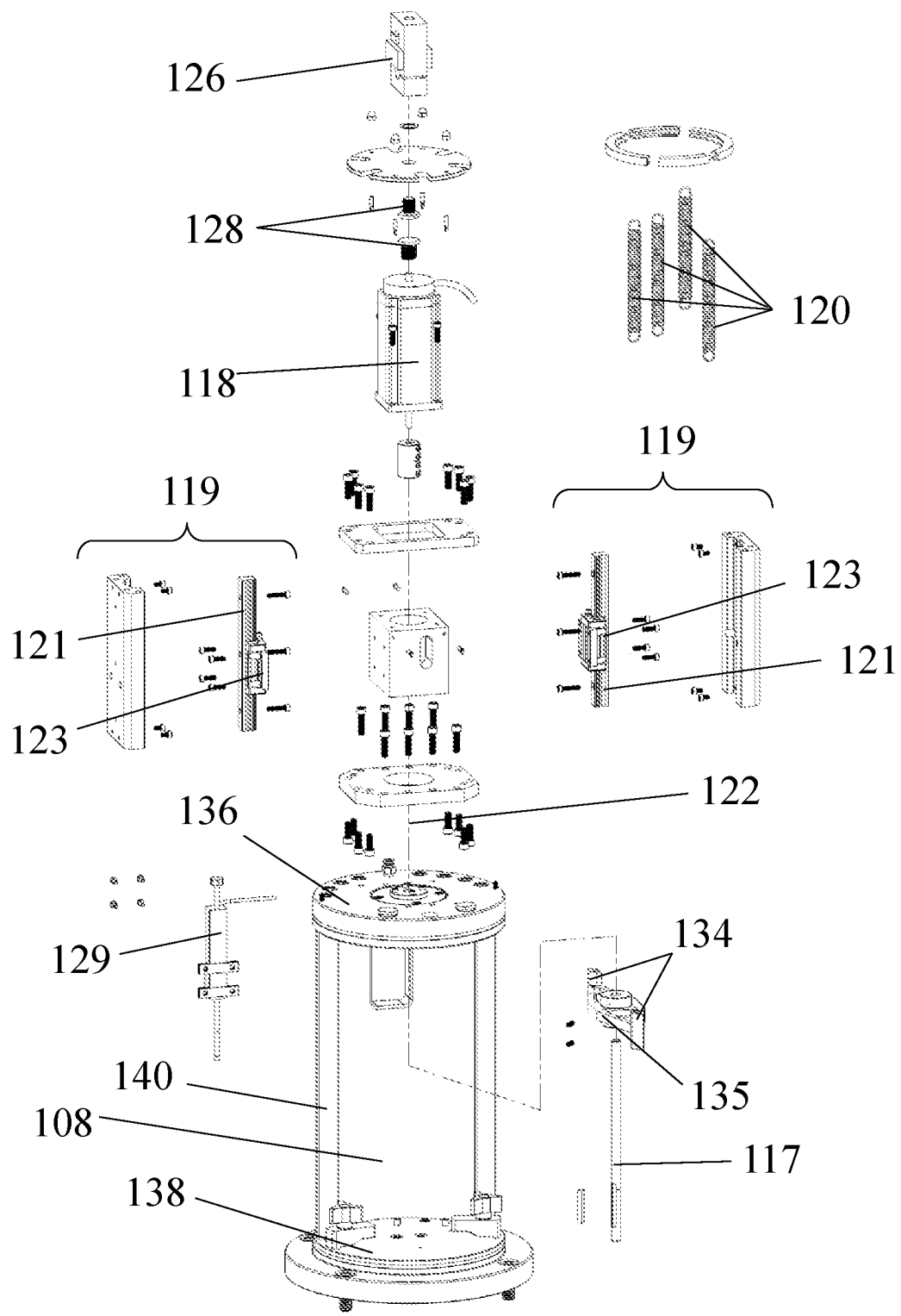
FIG. 9 is an exploded view of the resonant column shown in FIG. 8.
Figure 10:
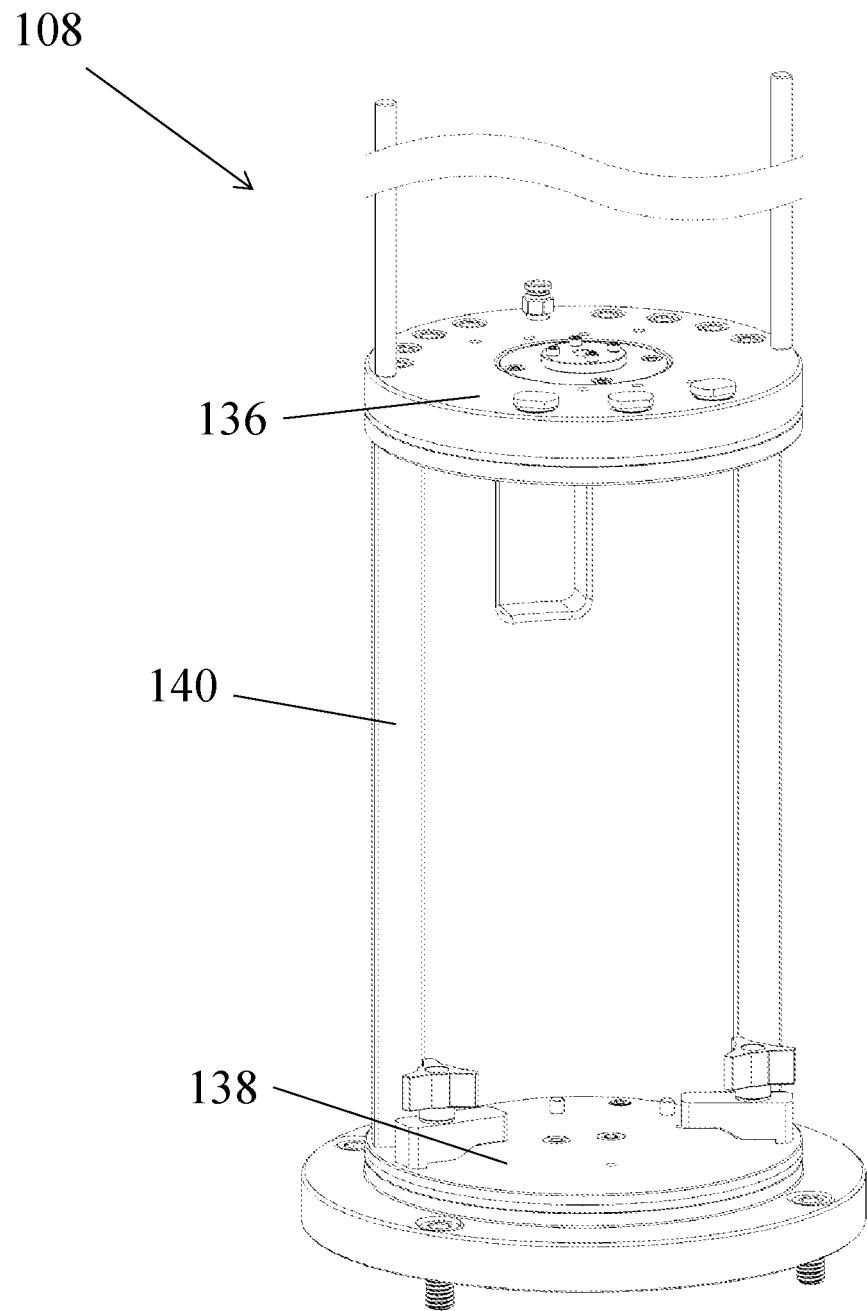
FIG. 10 is a perspective view of the specimen container of the resonant column device shown in FIG. 1.
Figure 11:
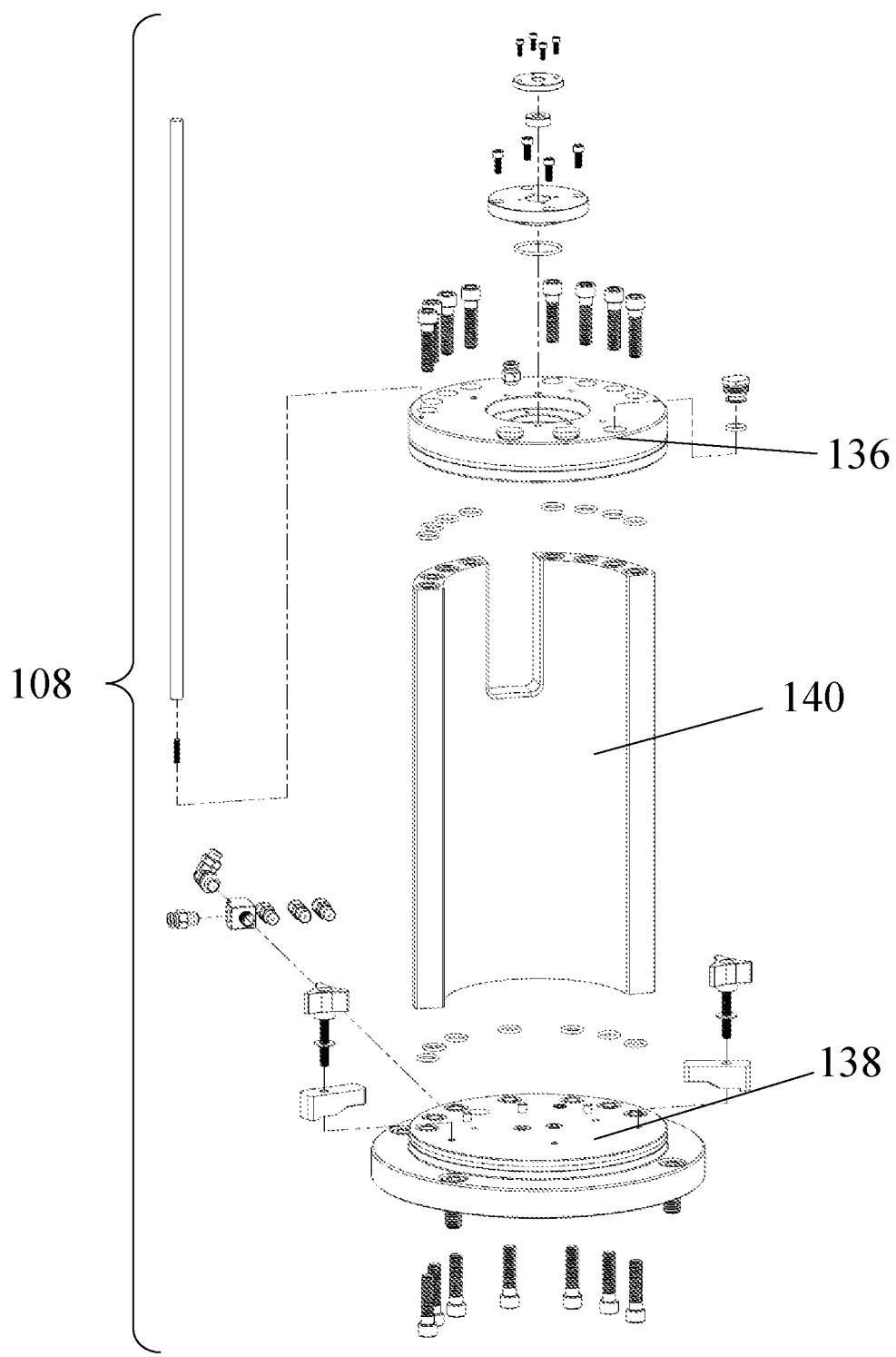
FIG. 11 is an exploded view of the specimen container shown in FIG. 10.

FIGS. 5-7 illustrate the resonant column device 100 with the housing 104 removed. FIGS. 8-11 illustrate exploded views of some of these components. As shown, the resonant column device 100 has a load frame 114 within the housing 104. The load frame 114 is supported by the base 103 and has a support bar 116 above the specimen container 108. The support bar 116 may extend horizontally above the specimen container 108. A torque motor 118 may be suspended from the support bar 116 with a plurality of springs 120, and may be aligned with a central axis 122 of the specimen container 108 above the specimen container 108. The torque motor 118 may be a servo motor. The torque motor 118 is configured to apply a torsional harmonic load to the specimen 102. The torque motor 118 may be rotationally coupled to the specimen 102 through a rotary shaft 117 extending into the specimen container 108. The torque motor 118 is also configured to move with the specimen 102 through vertical deformations of the specimen 102 without applying an axial load to the specimen 102. This vertical movement of the torque motor 118 is enabled by the plurality of springs 120. The plurality of springs 120 are balanced to the exact weight of the components supported by the plurality of springs 120, including the torque motor 118, such that the torque motor 118 floats and moves with the specimen 102 through vertical deformations without applying an axial load to the specimen 102. Such a configuration allows the torque motor 118 to be much heavier than is typical of a resonant column system because the weight of the torque motor 118 is supported by the plurality of springs 120 and the support bar 116, rather than the specimen 102, as is done with typical resonant column systems. This allows for significantly larger torque amplitudes and broadens the range of specimens 102 that can be successfully tested. The torque motor 118 may be coupled to a plurality of preloaded slide bearings 119. The preloaded slide bearings 119 are configured to limit movement of the torque motor 118 in a horizontal direction while allowing movement in a vertical direction. The preloaded slide bearings 119 may comprise a rail 121 and a carriage 123. In such an embodiment, the torque motor 118 is fixedly coupled to the carriage 123 and the carriage 123 is slidably coupled to the rail 121 and configured to move along the rail 121.

An axial actuator 124 may also be coupled to the support bar 116 of the load frame 114. Like the torque motor 118, the axial actuator 124 is aligned with the central axis 122 of the specimen container 108. The axial actuator 124 is configured to apply an axial load to the specimen 102. This axial load applied by the axial actuator 124 produces anisotropic consolidation of the specimen 102. The anisotropic consolidation of the specimen 102 may be necessary in order to reproduce actual field stress paths, which may significantly affect the material dynamic characteristics. Thus, the test results from the resonant column device 100 are more accurate because of the anisotropic consolidation of the specimen 102. A load cell 126 may be operatively coupled to the axial actuator 124. The load cell 126 is configured to measure the axial load applied by the axial actuator 124. In addition, a plurality of spherical load buttons 128 may be coupled to the axial actuator 124. The spherical load buttons 128 are configured to transmit the axial load from the axial actuator 124 to the specimen 102 without transmitting any torque. Thus, the spherical load buttons 128 limit the torque transmission to the axial actuator 124 so that the axial actuator 124 does not offer any resistance to the torque force applied by the motor to the specimen 102. A linear variable differential transformer (LVDT) 129 or other displacement sensor, such as a linear potentiometer, may be coupled to the torque motor 118. The LVDT 129 is configured to measure a vertical compression of the specimen 102 which occurs as the axial actuator 124 applies the axial load to the specimen 102.

The resonant column device 100 also comprises a laser deformation sensor 130 supported by the base 102 within the housing 104. As the torsional harmonic load is applied to the specimen 102 by the torque motor 118, the specimen 102 experiences angular deformations. These angular deformations can be used to calculate the first-mode resonant frequency and other dynamic soil properties. The laser deformation sensor 130 may be located outside of the specimen container 108 and is configured to measure the angular deformation of the specimen 102 through the cell wall 112. Because the laser deformation sensor 130 is located outside of the specimen container 108, the laser deformation sensor 130 is not subject to the changing environmental conditions within the specimen container 108, such as pressure and moisture, and thus does not experience corrosion and wear as quickly as the sensors in current resonant column systems do. In some embodiments, the laser deformation sensor 130 has a laser 132 configured to emit a laser beam and a shear strain target 134 positioned on a target support frame 135. The laser 132 may have a high frequency response, such as 10 kHz. The shear strain target 134 may be positioned at between a 10 degree angle to a 45 degree angle from the laser beam. This allows the laser deformation sensor 130 to measure a distance between the laser 132 and the shear strain target 134 over time. Due to the 45 degree angle, this distance is equal to the lateral movement of the shear strain target 134, and can be used to calculate the angular rotation and the shear strain of the specimen 102, and thus determine the angular deformation. The laser deformation sensor 130 has a larger range than the typical sensors used to measure the angular deformation of the specimen 102, allowing the laser deformation sensor 130 to be placed outside of the specimen container 108. This is not possible with angular deformation sensors used in typical resonant column systems. In a particular embodiment, a 45 degree angle is used on one side and a 10 degree angle is used on the other side of the shear strain target 134 to extend the angular deformation measurement range by only reversing the shear strain gtarget 134. An additional advantage to the laser deformation sensor 130 is that the laser deformation sensor 130 is capable of measuring both the high shear strain amplitudes and the low shear strain amplitudes, as opposed to the typical systems which measure the high shear strain amplitudes using accelerometers or the low shear strain amplitudes using proximitors. This removes the need to replace sensors for different tests, especially sensors inside of the specimen container 108, and thus saves additional time and reduces the required expertise.

The specimen container 108 may comprise a top cell plate 136, a bottom cell plate 138, and a cell column 140. The top cell plate 136 and the bottom cell plate 138 are joined by the cell column 140, and the rotary shaft 117 extends through the top cell plate 136. The cell column 140 may have a cross section with a half-pipe shape (see FIG. 11), or some other shape with one side open. This allows the specimen 102 to be accessed without having to disconnect the top cell plate 136, the bottom cell plate 138, and the cell column 140. The cell column 140 is designed to have a first vibration mode that is much higher than that of typical specimens 102 so that the cell column does not vibrate excessively during testing. This may be done by increasing the cross sectional area of the cell column 140 to increase the stiffness of the cell column 140. The high stiffness of the cell column 140 together with the high torque motor 118 allows the resonant column device 100 to test rock and asphalt specimens 102 in addition to the typical soil specimens 102. The resonant column device 100 may comprise a water reservoir 142 and a vacuum pump within the housing 104. The water reservoir 142 is configured to supply water to the specimen container 108 during testing. In some cases, the specimen 102 may be submerged in water during testing by filling the specimen container 108 with water from the water reservoir 142. The vacuum pump is configured to decrease the pressure within the specimen container 108. The vacuum pump may be a venturi vacuum pump.

During a resonant column test, many of the components disclosed above must be activated and used together. In typical resonant column system, this adds to the complexity of the test, which is why a high degree of expertise is required. With the presently disclosed resonant column device 100, the function of the components together may be automated. The resonant column device 100 includes computer-controlled valves, actuators, and plumbing which are used to, among other things, lift and lower the cell wall 112, and to fill and empty the specimen container 108. In addition, the software included in the resonant column device 100 uses the components disclosed above to automatically perform the resonant column test and report the results to the user. The electronics required for such automation and software, as known in the art, may be contained within one or more electronics boxes 144, as shown in FIGS. 5-7. This automation makes the resonant column test simple to carry out and reduces the need for high expertise. This, in turn, makes resonant column tests cheaper to run and more accessible to more companies.

It will be understood that implementations of a resonant column device are not limited to the specific assemblies, devices and components disclosed in this document, as virtually any assemblies, devices and components consistent with the intended operation of a resonant column device may be used. Accordingly, for example, although particular resonant column devices, and other assemblies, devices and components are disclosed, such may include any shape, size, style, type, model, version, class, measurement, concentration, material, weight, quantity, and/or the like consistent with the intended operation of resonant column devices. Implementations are not limited to uses of any specific assemblies, devices and components; provided that the assemblies, devices and components selected are consistent with the intended operation of a resonant column device.

Accordingly, the components defining any resonant column device may be formed of any of many different types of materials or combinations thereof that can readily be formed into shaped objects provided that the materials selected are consistent with the intended operation of a resonant column device. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various resonant column devices may be manufactured using conventional procedures as added to and improved upon through the procedures described here. Some components defining a resonant column device may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling resonant column devices are not limited to the specific order of steps as disclosed in this document. Any steps or sequence of steps of the assembly of a resonant column device indicated herein are given as examples of possible steps or sequence of steps and not as limitations, since various assembly processes and sequences of steps may be used to assemble resonant column devices.

The implementations of a resonant column device described are by way of example or explanation and not by way of limitation. Rather, any description relating to the foregoing is for the exemplary purposes of this disclosure, and implementations may also be used with similar results for a variety of other applications employing a resonant column device.

What is claimed is:

1. A resonant column device, comprising:
a housing mounted on a base and having an interior volume;
a specimen container within the housing and supported by the base, the specimen container comprising a top cell plate, a bottom cell plate, a cell column joining the top cell plate and the bottom cell plate and having a half-pipe-shaped cross section, and a central axis passing through a center of the specimen container, the specimen container configured to hold a specimen during testing;
an acrylic cell wall surrounding the specimen container and configured to fluidly isolate the specimen container from the interior volume of the housing to enable a variable pressure within the specimen container;
a load frame within the housing and supported by the base, the load frame having a support bar extending horizontally above the specimen container;
a torque motor suspended from the support bar of the load frame with a plurality of springs and aligned with the central axis of the specimen container above the top cell plate, the torque motor configured to apply a torsional harmonic load to the specimen and move with the specimen through vertical deformations of the specimen without applying an axial load to the specimen;
an axial actuator coupled to the support bar of the load frame, aligned with the central axis of the specimen container, and configured to apply an axial load to the specimen to produce anisotropic consolidation of the specimen;
a load cell operatively coupled to the axial actuator and configured to measure the axial load applied by the axial actuator;
a laser deformation sensor supported by the base within the housing outside of the specimen container and configured to measure an angular deformation of the specimen, the laser deformation sensor having a laser configured to emit a laser beam and a shear strain target positioned on a target support frame at an angle from the laser beam of between 10 degrees and 45 degrees from the laser beam; and
an automatic cell lift coupled to the base and configured to lift the acrylic cell wall to provide access to the specimen;
wherein the resonant column device is configured to automatically perform a resonant column test on the specimen upon activation and determine a first-mode resonant frequency of the specimen.

2. The resonant column device of claim 1, further comprising a water reservoir within the housing configured to supply water to the specimen container and submerge the specimen in water during testing.

3. The resonant column device of claim 1, further comprising a plurality of spherical load buttons coupled to the axial actuator and configured to transmit the axial load from the axial actuator to the specimen with negligible torque.

4. The resonant column device of claim 1, further comprising a plurality of preloaded slide bearings coupled to the torque motor and configured to limit movement of the torque motor in a horizontal direction while allowing movement in a vertical direction.

5. The resonant column device of claim 1, wherein a portion of the cell wall is exposed by an opening through the housing and wherein the specimen is accessible through the opening when the cell wall is lifted by the automatic cell lift.

6. The resonant column device of claim 1, wherein the specimen is one of a soil specimen, a rock specimen, and an asphalt specimen.

7. The resonant column device of claim 1, further comprising a linear variable differential transformer fixedly coupled to the torque motor and configured to measure a vertical compression of the specimen caused by the axial actuator.

8. A resonant column device, comprising:
a housing mounted on a base and having an interior volume;

a specimen container within the housing and supported by the base, the specimen container comprising a cell column and configured to hold a specimen during testing;

a cell wall surrounding the specimen container and configured to fluidly isolate the specimen container from the interior volume of the housing;

a load frame within the housing and supported by the base, the load frame having a support bar above the specimen container;

a torque motor suspended from the support bar of the load frame with a plurality of springs and configured to apply a torsional harmonic load to the specimen; and a laser deformation sensor supported by the base within the housing outside of the specimen container and configured to measure an angular deformation of the specimen;

wherein the resonant column device is configured to perform a resonant column test on the specimen and determine a first-mode resonant frequency of the specimen.

9. The resonant column device of claim 8, further comprising a water reservoir within the housing configured to supply water to the specimen container and submerge the specimen in water during testing.

10. The resonant column device of claim 8, further comprising a plurality of preloaded slide bearings coupled to the torque motor and configured to limit movement of the torque motor in a horizontal direction while allowing movement in a vertical direction.

11. The resonant column device of claim 8, wherein a portion of the cell wall is exposed by an opening through the housing and wherein the specimen is accessible through the opening when the cell wall is lifted by the automatic cell lift.

12. The resonant column device of claim 8, wherein the specimen is one of a soil specimen, a rock specimen, and an asphalt specimen.

13. The resonant column device of claim 8, further comprising a linear variable differential transformer fixedly coupled to the torque motor and configured to measure a vertical compression of the specimen caused by the axial actuator.

14. The resonant column device of claim 8, wherein the cell column has a cross section with a half-pipe shape.

15. The resonant column device of claim 8, wherein the torque motor is further configured to move with the specimen through vertical deformations of the specimen without applying an axial load to the specimen.

16. The resonant column device of claim 8, further comprising an axial actuator coupled to the support bar of the load frame and configured to apply an axial load to the specimen to produce anisotropic consolidation of the specimen.

17. The resonant column device of claim 16, further comprising a plurality of spherical load buttons coupled to the axial actuator and configured to transmit the axial load from the axial actuator to the specimen and limit the torque transmission to the axial actuator.

18. The resonant column device of claim 16, further comprising a load cell operatively coupled to the axial actuator and configured to measure the axial load applied by the axial actuator.

19. The resonant column device of claim 8, further comprising an automatic cell lift coupled to the base and configured to lift the cell wall to provide access to the specimen.

20. The resonant column device of claim 8, wherein the specimen container further comprises a central axis passing through a center of the specimen container, and the torque motor is aligned with the central axis of the specimen container.

* * * * *